United States Patent Office 3,799,918
Patented Mar. 26, 1974

3,799,918
ALKYL ESTERS OF α-ASPARTYL α-ALKYL
ALIPHATIC AMINO ACID DIPEPTIDES
Robert H. Mazur, Deerfield, Ill., assignor to
G. D. Searle & Co., Chicago, Ill.
No Drawing. Filed Apr. 26, 1972, Ser. No. 247,665
Int. Cl. C07c 103/52; A23l 1/26
U.S. Cl. 260—112.5          4 Claims

ABSTRACT OF THE DISCLOSURE

Alkyl esters of α-aspartyl α-alkyl aliphatic amino acid dipeptides are potent sweetening agents and can be prepared by catalytic hydrogenolysis of the corresponding compounds having amino and β-carboxy protecting groups.

The present invention relates to novel dipeptide alkyl esters which are useful as sweetening agents. More particularly, this invention concerns α-aspartyl α-alkyl aliphatic amino acid dipeptides represented by the general structural formula

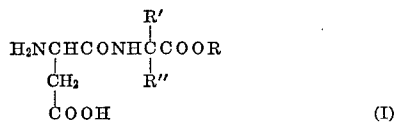

(I)

wherein R and R' are each a methyl or ethyl radical and R" is an alkyl radical containing 4 to 7 carbon atoms.

The alkyl radicals containing 4 to 7 carbon atoms which are represented by R" are butyl, pentyl, hexyl and heptyl and the branched-chain groups isomeric therewith.

A preferred group of compounds encompassed by Formula I consists of those compounds wherein R and R' are each a methyl radical. Another preferred embodiment of the invention consists of the compounds wherein R" is a branched-chain alkyl radical. An especially desirable group of compounds includes those compounds in which R and R' are methyl and R" is a branched-chain alkyl group of 5 or 6 carbon atoms. A particularly valuable compound is L-α-aspartyl-DL-2-amino-2,5-dimethylhexanoic acid methyl ester, advantageously utilized in the form of its hemihydrate. Another preferred compound is L-α-aspartyl-L-2-amino - 2,5 - dimethylhexanoic acid methyl ester.

The novel compounds of Formula I are useful in consequence of their potent sweetening properties. The instant compounds are surprisingly superior, in terms of stability and sweetness potency, to the structurally related dipeptide esters described previously, for example in British Pat. No. 1,206,233. Especially desirable in view of its improved stability and high degree of sweetness potency is L-α-aspartyl-DL-2-amino - 2,5 - dimethylhexanoic acid methyl ester.

It has been determined that the property of sweetness is affected by the stereochemistry of the individual amino acid units comprising the dipeptide structure. The α-aspartyl portion of the compounds of Formula I must have the L configuration in order for sweetness to be present. It is obvious, however, that isomeric mixtures which contain the L-α-aspartyl derivatives, e.g. DL-α-aspartyl compounds, are also sweet and that such isomeric mixtures are within the scope of the present invention.

With respect to the aliphatic amino acid portion of the compounds of Formula I, it is to be noted that the L configuration has been found necessary for optimum sweetness. Isomeric mixtures containing the L-aliphatic amino acid derivatives of Formula I, e.g. DL-aliphatic amino acid compounds, are consequently also sweet and such mixtures are within the scope of this invention.

The compounds of Formula I can be prepared by removal of the protecting groups from the corresponding compounds of the general formula

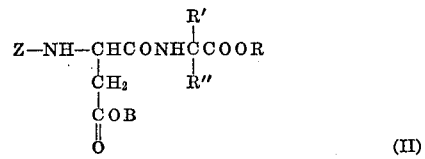

(II)

wherein R, R' and R" are as hereinabove defined, Z is an amino protecting group such as the function trityl, p-nitrobenzyloxycarbonyl, p-bromobenzyloxycarbonyl or benzyloxycarbonyl and B is a radical which forms a protective ester moiety, e.g. benzyl or p-methoxybenzyl. Such protecting groups can be conveniently removed by catalytic hydrogenolysis. Suitable catalysts include rhodium, platinum, ruthenium, Raney nickel and palladium (optionally on a support), a particularly preferred catalyst being palladium black. Alternatively, the protecting groups can be removed by treatment with a suitable acid such as HBr in an organic solvent.

As alternate starting materials, compounds corresponding to Formula II wherein Z is a tert-butoxycarbonyl radical and B is a tert-butyl radical can be employed. Such protecting groups are normally not sensitive to hydrogenolysis but can be removed by use of an acid such as trifluoroacetic acid.

The starting materials of Formula II can be prepared by contacting a compound of the general formula

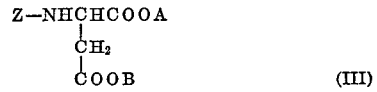

(III)

wherein Z and B are defined as above and A is a p-nitrophenyl, succinimido or alkoxycarbonyl radical, or similar group forming a labile oxygenated function, with an amino acid ester of the formula

(IV)

wherein R, R' and R" are defined as before. Alternatively, A in the compounds of Formula III can represent a hydrogen atom, in which case coupling with an amino acid ester of Formula IV is carried out in the presence of a suitable dehydrating agent such as dicyclohexylcarbodiimide.

Another process for the preparation of the compounds of Formula I comprises contacting the N-carboxyanhydride of L-aspartic acid (prepared by reacting L-aspartic acid with phosgene) with an amino acid ester of Formula IV. The reaction can be conducted in an anhydrous solvent at low temperatures, according to the method of J. Leggett Bailey described in J. Chem. Soc., 1950, 3461.

An alternate route to the subject compounds of Formula I comprises reacting an N-acyl-L-aspartic anhydride wherein the acyl group is a p-methoxycarbobenzoxy or carbobenzoxy radical with an amino acid ester of Formula IV in an inert organic solvent, followed by removal of the acyl group. The acyl group can be conveniently removed by catalytic hydrogenolysis or by treatment with a suitable acid such as HBr.

Still another route to the compounds of Formula I involves reacting a strong acid salt of L-aspartic anhydride with an amino acid ester of Formula IV. Appropriate salts for use in this advantageous one-step procedure include salts of strong inorganic acids such as hydrogen chloride, hydrogen bromide, hydrogen iodide, chlorosulfonic acid, fluorosulfonic acid and sulfuric acid; and salts of strong organic acids such as benzenesulfonic acid, p-toluenesulfonic acid, β-naphthalenesulfonic acid, dichloroacetic acid, trichloroacetic acid and trifluoroacetic acid.

The amino acid esters of Formula IV above which can be employed as starting materials in the procedures just described can be prepared via a synthetic route beginning with compounds of the general formula

wherein R' and R" are defined as before. Those ketones are converted to the corresponding hydantoins of the formula

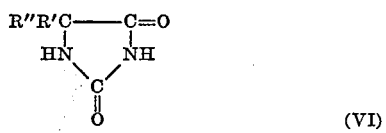

by known methods, e.g. by reaction of the ketone with sodium cyanide or potassium cyanide and ammonium carbonate, as described by Henze and Speer, J. Am. Chem. Soc. 64, 522 (1942) and by Goodson et al., J. Org. Chem. 25, 1920 (1960). The reaction is conveniently conducted in a suitable solvent such as aqueous ethanol at elevated temperature and, when potassium cyanide is employed, under pressure. The hydantoins of Formula VI are then subjected to hydrolytic cleavage to afford the corresponding compounds of the formula

wherein R' and R" are as hereinbefore defined. The hydrolysis can be carried out in acid or basic solution according to the methods of Goodson et al., J. Org. Chem. 25, 1920 (1960). Acid hydrolysis generally entails use of aqueous sulfuric acid at elevated temperature while base hydrolysis most often involves use of barium hydroxide and water at elevated temperature and optionally under pressure. The amino acids of Formula VII are then esterified, for example by reaction with thionyl chloride and the appropriate alcohol, to afford the desired starting materials of Formula IV.

The hydantoins of Formula VI and the corresponding amino acids of Formula VII are obtained, according to the procedures hereinabove described, as DL mixtures. When the compounds of Formula I wherein the aliphatic amino acid portion possesses the L configuration are desired, it is convenient to resolve the appropriate amino acid of Formula VII and to employ the pure L compound thus obtained in the subsequent esterification, coupling and catalytic hydrogenolysis steps. To resolve the DL racemates of Formula VII, those racemates are acetylated with acetic anhydride and aqueous sodium hydroxide and the N-acetyl derivatives thus obtained are treated with an optically active base such as cinchonidine, brucine, cinchonine, hydroxyhydrindamine, menthylamine, morphine, α-phenylethylamine, phenyl oxynaphthyl methylamine, quinidine, quinine or strychnine to afford the optically pure salt from which the amino acid of Formula VII in its pure L form can be readily regenerated. In this manner DL-2-amino-2,5-dimethylhexanoic acid (prepared by reaction of 5-methyl-2-hexanone with potassium cyanide and ammonium carbonate, followed by treatment of the resultant DL-5-isopentyl-5-methylhydantoin with barium hydroxide and water) is resolved to give L-2-amino-2,5-dimethylhexanoic acid. That compound is then esterified using thionyl chloride and methanol and the ester thus obtained is coupled with N-benzyloxycarbonyl - L - aspartic acid β-benzyl ester. Catalytic hydrogenolysis of the resultant β - benzyl N - benzyloxycarbonyl - L - α - aspartyl - L - 2 - amino - 2,5 - di- methylhexanoic acid methyl ester using palladium black catalyst affords the desired sweetening agent of Formula I, namely L-α-aspartyl-L-2-amino-2,5-dimethylhexanoic acid methyl ester.

The compounds of Formula I can be utilized as sweetening agents in a variety of suitable forms. Typical forms which can be employed are: solid forms such as powders, tablets, granules and dragées; and liquid forms such as solutions, suspensions, syrups and emulsions, as well as other commonly employed forms particularly suited for combination with edible materials. The term "edible materials" as used here and throughout the specification signifies all non-toxic substances consumable or ingestible by humans or other animals in solid or liquid form. Illustrative of such substances are: foods, including foodstuffs; prepared food items; chewing gum and beverages; food additives, including flavoring and coloring agents as well as flavor enhancers; known sweetening agents, including natural and artificial sweeteners; and proprietary and non-proprietary pharmaceutical preparations.

The instant compounds can be formulated into preparations which can consist of the instant compounds apart from or in association with non-toxic sweetening agent carriers, i.e. non-toxic substances commonly employed in association with sweetening agents. Such suitable carriers include liquids such as water, ethanol, glycerol, corn oil, peanut oil, soybean oil, sesame oil, propylene glycol, corn syrup, maple syrup and liquid paraffin; and solids such as citric acid, lactose, mannitol, cellulose, starch, dextrin and other modified starches, carbohydrate material such as hydrolyzed cereal solids, calcium sulfate and di- and tri-calcium phosphate. Obviously incompatible for use with these compositions would be toxic carriers such as methanol and dimethylsulfoxide.

Likewise useful and compatible are those novel compositions containing a dipeptide ester of Formula I combined with a known sweetening agent such as saccharin, cyclamate, sucrose or sorbitol.

Examples of specific edible materials which can be sweetened by the addition of a compound of Formula I, or by the addition of a novel combination of a compound of Formula I with a known sweetening agent such as sucrose, sorbitol, cyclamate or saccharin, apart from or in association with a non-toxic sweetening agent carrier, include: fruits; vegetables; juices; meat products such as ham, bacon and sausage; egg products; fruit concentrates; gelatins and gelatin-like products such as jams, jellies and preserves; milk products such as ice cream, sour cream and sherbet; icings; syrups, including molasses; corn, wheat, rye, soybean, oat and rice products such as bread, cereals, pasta and cake mixes; fish and seafood; cheese and cheese products; nut meats and nut products; beverages such as coffee, tea, non-carbonated and carbonated soft drinks, beers, wines and other liquors; confections such as candy and fruit-flavored drops; condiments such as herbs, spices and seasonings; vinegar and other salad dressings; and flavor enhancers such as monosodium glutamate. Additional illustrations of the types of commercial products in which a sweetening agent of Formula I, or a composition containing a sweetening agent of Formula I plus a known sweetening agent, can be used are: chewing gum, prepared packaged products such as dietetic sugar, liquid sweeteners, granulated flavor mixes which upon constitution with water provide non-carbonated drinks, instant pudding mixes, instant coffee and tea, coffee whiteners, malted milk mixes, pet foods, livestock feed, tobacco, dietary supplements, and consumable toiletries such as mouthwashes and toothpastes, as well as other proprietary and non-proprietary pharmaceutical preparations and other products of the food, pharmaceutical and sundries industries too numerous to mention, for which a demand has been created by the diabetic- and dietetic-conscious public.

Specific illustrations of the preparation of various sweetened edible materials are given below. It should be noted that the concentrations recited in these formulations are given for the purpose of illustration only, it being recognized that individual taste preferences for degrees of sweetness vary so substantially that limits for usable ranges of concentrations cannot be clearly delineated.

Powder beverage concentrate

The powder is prepared by mixing 0.05 part of citric acid, 0.04 part of imitation strawberry flavoring, 0.022 part of L-α-aspartyl-DL-2-amino-2,5-dimethylhexanoic acid methyl ester hemihydrate and 0.61 part of lactose. To prepare the beverage, the powder is added to 99.3 parts of spring water and dissolved.

Gelatin dessert

A sample is prepared from 2.07 parts of plain gelatin, 0.34 part of imitation raspberry flavoring, 0.34 part of citric acid, 14.4 parts of lactose and 0.032 part of L-α-aspartyl-DL-2-amino-2,5-dimethylhexanoic acid methyl ester hemihydrate. The ingredients are combined and dissolved in 82.8 parts of boiling spring water. Thereafter the gelled solution is poured into dishes and chilled to set.

Heat treated peach pack

Fresh, peeled peaches, after washing, removal of the pits and slicing into pieces of the desired size (the fruit content equaling approximately 40–70% by weight of the resulting puree), are added to a syrup containing, per each 284 g. can of puree, 0.55 g. of L-α-aspartyl-DL-2-amino-2,5-dimethylhexanoic acid methyl ester hemihydrate and sufficient water to dissolve the dipeptide and bring the total amount of puree to about 284 g. (When the fruit content equals 40% by weight of the puree, the amount of water employed per 284 g. can of puree is about 170 g.; when the fruit content is 70% approximately 85 g. of water per 284 g. can is used.) The mixture is then acidified by the addition of citric acid such that the ratio between the acid and the sweetness content is 1:30. The prepared puree is then packed cold in 284 g. cans. Prior to sealing the containers, the product undergoes a steam exhaustion for 5 minutes. After sealing, the cans are treated for 15 minutes at 100° C.

Carbonated orange beverage

To 11.0 g. of L-α-aspartyl-DL-2-amino-2,5- dimethylhexanoic acid methyl ester hemihydrate in 3000 ml. of water are added 15 g. of citric acid, 10 g. of sodium benzoate, 2 oz. of orange flavor concentrate and sufficient water to provide 1 gallon of bottler's syrup. A 2 oz. throw of this bottler's syrup is used per 10-oz. bottle, which is thereafter filled with carbonated water to give 1.5 volumes of carbon dioxide gas.

Carbonated orange soda

A stock supply of bottler's syrup is prepared by mixing 5.5 ml. of a 50% aqueous citric acid solution with 150 ml. of water, dissolving 0.62 g. of L-α-aspartyl-DL-2-amino-2,5-dimethylhexanoic acid methyl ester hemihydrate in that solution, adding successively 7.02 ml. of the orange flavor base manufactured by the A. E. Illes Company, Dallas, Tex., labelled FO–78, and 2.7 g. of sodium benzoate, then diluting that mixture to 200 ml. with water. 1-oz. samples of that bottler's syrup are transferred to 6-oz. bottles and 110 ml. of cold tap water is added to each bottle. To each bottle 42 ml. of cold charged bottling water (5 volumes carbon dioxide) is then added to achieve carbonation. Each bottle is capped and the contents mixed.

Carbonated cola beverage

To a solution of 11.2 g. of L-α-aspartyl-DL-2-amino-2,5-dimethylhexanoic acid methyl ester hemihydrate in 3000 ml. of water is added ¼ oz. of 85% phosphoric acid, 10 g. of sodium benzoate, 2 oz. of cola flavor concentrate and sufficient water to make one gallon of bottler's syrup. A 2 oz. throw of bottler's syrup is used per 10-oz. bottle, which is then filled with carbonated water to give 3.4 volumes of carbon dioxide.

Milk pudding 1.14 oz. of the following formula is added to two cups of cold skimmed milk in a bowl, stirred slowly with an egg beater to disperse the powder, and then mixed rapidly until a smooth texture is obtained. The mixture is then allowed to set.

Alginate—6 lb.
Cocoa—30 lb.
Tetrasodium pyrophosphate, anhydrous—3 lb.
Salt—1 lb., 8 oz.
L-α-aspartyl-DL-2-amino - 2,5 - dimethylhexanoic acid methyl ester hemihydrate—1 lb., 3 oz.
Vanillin—4.8 oz.

Preserves (100 lb. batch)

Fruit—55 lb.
L-α-aspartyl-DL-2-amino - 2,5 - dimethylhexanoic acid methyl ester hemihydrate—1.5 oz.
Pectin (low methoxyl)—1 lb.
Potassium sorbate—1 oz.
Water—5 gal., 1 pint Dietetic syrup L-α-aspartyl-DL-2-amino - 2,5 - dimethylhexanoic acid methyl ester hemihydrate—0.28%
Carboxymethylcellulose—0.50%
Pectin—1.60%
Flavor—8.50%
Citric acid, anhydrous—2.00%
Color—0.30%
Sodium benzoate—0.10%
Water—86.72%

Dry sweetening product

A mixture containing 2.2% by weight of L-α-aspartyl-DL-2-amino-2,5-dimethylhexanoic acid methyl ester hemihydrate and 97.8% by weight of hydrolyzed cereal solids having a low dextrose equivalent (e.g. 9 to 12%) is combined with water and then spray dried. The resulting dry product is of such a density that, spoon for spoon, it is approximately equal to sucrose in sweetening power.

The invention will appear more fully from the examples which follow. These examples are given by way of illustration only and are not to be construed as limiting the invention either in spirit or in scope as many modifications both in materials and methods will be apparent to those skilled in the art. In these examples, temperatures are given in degrees centigrade (° C.) and quantities of materials are expressed in parts by weight unless parts by volume are specified. The relationship between parts by weight and parts by volume is the same as that existing between grams and milliliters. Specific rotation values are those determined using the D line of sodium (5893 A.) as the wavelength of light.

EXAMPLE 1

57.09 parts of 5-methyl-2-hexanone is mixed with 42.3 parts of potassium cyanide and 159 parts of ammonium carbonate. That mixture and 570 parts by volume of a 1:1 by volume mixture of ethanol and water are placed in a stainless steel reaction vessel, sealed, heated to 55° C. with shaking and maintained at that temperature for 24 hours. The crystalline material is removed, rinsed with methanol-denatured ethanol, filtered and dried to afford DL-5-isopentyl-5-methylhydantoin, melting at about 154–159° C. That compound possesses anti-ulcer and anti-hypertensive activity and is represented by the structural formula $$(CH_3)_2CHCH_2CH_2-\underset{HN\diagdown\diagup NH}{\overset{CH_3}{\underset{\underset{O}{\|}}{|}}}=O$$

EXAMPLE 2

55 parts of DL-5-isopentyl-5-methylhydantoin, 283 parts of barium hydroxide octahydrate and 1000 parts of water are placed in a stainless steel reaction vessel. The vessel is sealed, heated to approximately 100° C. and maintained at that temperature for 38 hours. The reaction vessel is cooled and the contents are removed. The foamy mixture thus obtained is heated to near the boiling point and carbon dioxide is bubbled through the mixture for 1 hour. The resulting mixture is filtered to remove precipitated barium carbonate. The filtrate is stripped and the residual slurry is shaken with methanol-denatured ethanol, then stripped of solvent. That residue is shaken and stripped in the same manner as before and the resulting residue is shaken with ether, filtered and dried. The dried material is combined with water and that mixture is heated until the solid dissolves. The solution is allowed to cool to room temperature over a 16 hour period and the crystals which form are separated by filtration and dried, affording DL-2-amino-2,5-dimethylhexanoic acid melting at about 250–260° C. with decomposition and possessing anti-ulcer, hypocholesterolemic and anti-fungal activity.

EXAMPLE 3

To approximately 99 parts of methanol, cooled to −10° C., is added dropwise 7.2 parts by volume of thionyl chloride. 8.0 parts of DL-2-amino-2,5-dimethylhexanoic acid is added and the reaction mixture is allowed to reflux for approximately 3 days. The solution is then stripped, shaken with ether, stripped again and dried in vacuo. The resulting oil solidifies slowly and is then triturated with n-hexane to give DL-2-amino-2,5-dimethylhexanoic acid methyl ester hydrochloride tritohydrate. That product, which exhibits anti-ulcer activity, is characterized by a melting point of 98–101° C. and by the structural formula

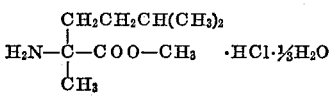

EXAMPLE 4

17.8 parts of N-benzyloxycarbonyl-L-aspartic acid β-benzyl ester is dissolved in 200 parts by volume of methylene chloride. The resulting solution is cooled to −20° C. and 5.3 parts of N-methylmorpholine is added, followed by the dropwise addition of 7.0 parts of isobutyl chloroformate. The mixture is stirred and a solution containing 11.0 parts of DL-2-amino-2,5-dimethylhexanoic acid methyl ester hydrochloride, 100 parts by volume of methylene chloride and 5 parts of N-methylmorpholine is added. The resulting mixture is refrigerated for about 16 hours, then is filtered and stripped of solvent. The product is dissolved in ethyl acetate, washed three times with 1 N aqueous hydrochloric acid, twice with water, twice with 2 M aqueous potassium carbonate, and four more times with water, then dried over anhydrous sodium sulfate and filtered. The filtrate is stripped to afford, as an oil, β-benzyl N-benzyloxycarbonyl-L-α-aspartyl-DL-2-amino-2,5-dimethylhexanoic acid methyl ester. That compound possesses anti-ulcer activity.

EXAMPLE 5

14.75 parts of β-benzyl N-benzyloxycarbonyl-L-α-aspartyl-DL-2-amino-2,5-dimethylhexanoic acid methyl ester is warmed in 200 parts by volume of 90% aqueous acetic acid until dissolved. 1.4 parts of palladium black catalyst is added and the mixture is hydrogenolyzed at room temperature and a pressure of approximately 4 atmospheres for about two and one-half hours. The catalyst is removed by filtration and washed on the filter with 90% aqueous acetic acid. The combined filtrates are stripped to dryness, the residue is stripped once with water and the oil thus obtained is triturated with ether and then dried under reduced pressure to remove final traces of acetic acid. That glass-like material is again dissolved in ether and allowed to crystallize. The crystals are removed by filtration and washed with anhydrous ether, which causes the crystals to soften. That gummy material is allowed to harden, thus affording L-α-aspartyl-DL-2-amino-2,5-dimethylhexanoic acid methyl ester hemihydrate. That product exhibits a specific rotation of +8.3° in acetic acid at 25° C. and is represented by the structural formula

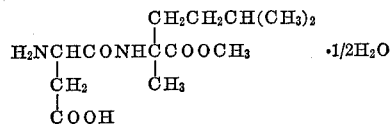

EXAMPLE 6

A mixture of 51.3 parts of 2-heptanone and 135 parts of ammonium carbonate in 750 parts by volume of a 3:2 by volume mixture of ethanol and water is heated to about 50° C. with stirring. To that mixture is added gradually over a period of about 10 minutes, a solution of 23.2 parts of sodium cyanide in 75 parts of water. The resulting mixture is stirred at about 60–65° C. for approximately 3 hours. The temperature is then elevated to 75–78° C. and the mixture is maintained at that temperature for about 2 hours to remove excess ammonium carbonate. The reaction mixture is then cooled, acidified to pH 6 with concentrated hydrochloric acid and refrigerated for about 88 hours. The white crystals which form are collected by filtration, washed with cold water and dried to afford DL-5-methyl-5-pentylhydantoin, melting at about 100–102° C.

EXAMPLE 7

To 55.2 parts of DL-5-methyl-5-pentylhyantoin is gradually added a mixture of 126 parts by volume of concentrated hydrochloric acid and 84 parts of water. The resulting mixture is heated with stirring at approximately 130° C. for 74 hours. The resulting solution is poured into 500 parts of ice water and sufficient 10% aqueous ammonia is added to bring the mixture to pH 6. The mixture is cooled to room temperature with stirring, then filtered. The crude white solid thus obtained is dried, then recrystallized from a mixture of ethanol and water to afford DL-2-amino-2-methylheptanoic acid, melting at 298–300° C.

EXAMPLE 8

11.1 parts of DL-2-amino-2-methylheptanoic acid is added to a mixture of 10 parts of thionyl chloride and 198 parts of methanol. The resulting mixture is stirred at the reflux temperature for about 24 hours. Approximately 150 parts of chloroform is added and the azeotropic mixture of chloroform, methanol and water is slowly distilled off over a 24 hour period. The remaining solvent is removed from the reaction mixture, ether is added and the mixture is stripped to dryness. To 12.9 parts of the solid residue thus obtained is added 12.5 parts by volume of a saturated aqueous potassium carbonate solution. The mixture is extracted with ether, the ether extracts are dried over anhydrous magnesium sulfate and the solvent is removed to afford, as an oil, DL-2-amino-2-methylheptanoic acid methyl ester.

2.15 parts of DL-2-amino - 2 - methylheptanoic acid methyl ester is dissolved in ether and anhydrous hydrogen chloride is bubbled into the solution. Extraction of the ether under reduced pressure gives a white solid which is dried under vacuum, affording pure DL-2-amino-2-methylheptanoic acid methyl ester hydrochloride melting at 123–125° C. That compound exhibits antibacterial, antiprotozoal and antifungal activity.

EXAMPLE 9

A solution of 15.2 parts of N-benzyloxycarbonyl-L-aspartic acid β-benzyl ester in about 180 parts of tetrahydrofuran is cooled and 4.9 parts by volume of N-methylmorpholine is added. The resulting solution is cooled to about −30° C. and 5.76 parts of isobutyl chloroformate is added, keeping the temperature below −15° C. The reaction mixture is stirred for 15 minutes and 7.0 parts of DL-2-amino-2-methylheptanoic acid methyl ester is added at about −20° C. The mixture is then allowed to stand at about 5° C. for approximately 18 hours. 1 part by volume of 2-dimethylaminoethylamine is added and the mixture is stirred for 15 minutes, then filtered. The residue is washed with tetrahydrofuran, the combined filtrates are concentrated under reduced pressure and the resulting oil is dissolved in 270 parts of ethyl acetate. That solution is washed successively with 1 N aqueous hydrochloric acid, water, 2 M aqueous potassium carbonate solution and again with water. The ethyl acetate solution is then dried over anhydrous magnesium sulfate. Removal of the solvent affords a clear oil which is chromatographed on a silica gel column, using a 1:9 by volume ethyl acetate-benzene mixture as eluant. The eluate is dried in vacuo at room temperature for about 6 hours, affording as a clear oil β-benzyl N-benzyloxycarbonyl-L-α-aspartyl-DL-2-amino-2-methylheptanoic acid methyl ester. That product is characterized by a specific rotation of −9.1° in dimethylformamide at 28.4° C.

EXAMPLE 10

4 parts of β-benzyl N-benzyloxycarbonyl-L-α-aspartyl-DL-2-amino-2-methylheptanoic acid methyl ester is hydrogenolyzed in 225 parts by volume of 90% aqueous acetic acid, using 0.4 part of palladium black catalyst, at room temperature and a pressure of 4 atmospheres for about 5 hours. The catalyst is removed by filtration and washed with 90% aqueous acetic acid and the combined filtrates are stripped to dryness. The residue is stripped twice with water and once with 2-propanol, then shaken with ethyl ether to give L-α-aspartyl-DL-2-amino-2-methylheptanoic acid methyl ester.

EXAMPLE 11

Substitution of equivalent quantities of 6-methyl-2-heptanone 5-methyl-3-hexanone and 7-methyl-2-octanone for one of the ketones used in Examples 1 and 6 and substantial repetition of the procedure employed in either of those examples affords DL-5-isohexyl-5-methylhydantoin, DL-5-ethyl-5-isobutylhydantoin and DL-5-methyl-5-(5-methylhexyl)hydantoin, respectively.

EXAMPLE 12

When equivalent quantities of DL-5-isohexyl-5-methylhydantoin, DL - 5 - ethyl - 5 - isobutylhydantoin and DL-5 - methyl - 5 - (5-methylhexyl)hydantoin are substituted for one of the hydantoins used in Examples 2 and 7 and the procedure described in either of those examples is substantially repeated there are obtained DL-2-amino-2,6-dimethylheptanoic acid, DL - 2 - amino-2-ethyl-4-methylvaleric acid and DL - 2 - amino - 2,7-dimethyloctanoic acid, respectively.

EXAMPLE 13

Repetition of the esterification procedure detailed in the first paragraph of Example 8 using DL-2-amino-2,6-dimethylheptanoic acid and DL-2-amino-2,7-dimethyloctanoic acid in place of the DL-2-amino-2-methylheptanoic acid employed therein affords DL-2-amino-2,6-dimethylheptanoic acid methyl ester and DL-2-amino-2,7-dimethyloctanoic acid methyl ester, respectively.

When the esterification process described in Example 8 is repeated employing DL-2-amino-2-ethyl-4-methylvaleric acid and ethanol, there is obtained DL-2-amino-2-ethyl-4-methylvaleric acid ethyl ester.

EXAMPLE 14

Reaction of N-benzyloxycarbonyl L-aspartic acid β-benzyl ester with each of the amino acid alkyl esters prepared in Example 13 affords, according to the process of Example 9, β-benzyl N-benzyloxycarbonyl-L-α-aspartyl-DL - 2 - amino - 2,6-dimethylheptanoic acid methyl ester, β-benzyl N-benzyloxycarbonyl-L-α-aspartyl-DL-2-amino-2,7 - dimethyloctanoic acid methyl ester and β-benzyl N-benzyloxycarbonyl - L - α - aspartyl - DL - 2 - amino - 2-ethyl-4-methylvaleric acid ethyl ester. Catalytic hydrogenolysis of those compounds according to the procedure of Example 10 affords, after suitable isolation, L-α-aspartyl-DL-2-amino-2,6-dimethylheptanoic acid methyl ester, L - α - aspartyl - DL - 2 - amino - 2,7-dimethyloctanoic acid methyl ester and L-α-aspartyl-DL-2-amino-2-ethyl-4-methylvaleric acid ethyl ester, respectively.

What is claimed is:
1. A compound of the formula

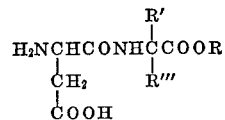

wherein R and R′ are each a methyl or ethyl radical, R‴ is a branched-chain alkyl radical containing 4 to 7 carbon atoms and the stereochemical configuration is L-L, DL-L, L-DL or DL-DL.

2. As in claim 1, a compound of the formula

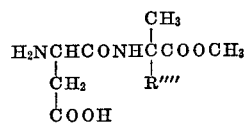

wherein R″″ is a branched-chain alkyl radical containing 5 or 6 carbon atoms and the stereochemical configuration is L-L, DL-L, L-DL or DL-DL.

3. As in claim 1, the compound which is L-α-aspartyl-DL-2-amino-2,5-dimethylhexanoic acid methyl ester.

4. As in claim 1, the compound which is L-α-aspartyl-L-2-amino-2,5-dimethylhexanoic acid methyl ester.

References Cited

UNITED STATES PATENTS 3,695,898  8/1972  Hill et al. ......... 260—112.5
3,475,403  8/1969  Mazur et al. ...... 260—112.5

OTHER REFERENCES

Mazur et al., J. Am. Chem. Soc., 91, 2684 (1969).

LEWIS GOTTS, Primary Examiner
R. J. SUYAT, Assistant Examiner

U.S. Cl. X.R.
99—141 A